United States Patent
Tubeuf

[11] 3,815,555
[45] June 11, 1974

[54] HYDRAULIC HEAT ENGINE

[75] Inventor: Jean André Georges Tubeuf, Le Chesnay, France

[73] Assignee: Societe anonyme dite Societe Europeenne De Propulsion, Puteaux, France

[22] Filed: Mar. 17, 1972

[21] Appl. No.: 235,481

[30] Foreign Application Priority Data
Mar. 19, 1971 France.............................. 72.09846
Apr. 20, 1971 France.............................. 72.14022

[52] U.S. Cl. ................................................. 123/19
[51] Int. Cl. ............................................ F02b 75/00
[58] Field of Search............................ 123/19; 91/4

[56] References Cited
UNITED STATES PATENTS

| | | | |
|---|---|---|---|
| 228,555 | 6/1880 | Pike ................................. | 91/4 |
| 715,131 | 12/1902 | Orr ................................... | 91/4 |
| 716,731 | 12/1902 | Maurer ............................. | 123/19 |
| 781,923 | 2/1905 | Vogt ................................. | 123/19 |
| 1,102,400 | 7/1914 | Fisher ............................... | 123/19 |
| 1,314,153 | 8/1919 | Schneider ......................... | 91/4 |
| 2,145,540 | 1/1939 | Ellis .................................. | 91/4 |

*Primary Examiner*—C. J. Husar

[57] ABSTRACT

An hydraulic heat engine having an upright cylinder with a first conduit thereto for introducing liquid, for example sea water, into the cylinder in which the liquid is in effect a piston leaving an expansion chamber space at the upper end of the cylinder into which propellant such as hot expanding gaseous media or a fuel mixture which expands upon combustion is introduced through a second conduit to expand and propel the liquid piston down and out through a third conduit from a lower part of the cylinder. This third conduit transmits the propelled liquid to a first transfer chamber to move a first piston therein mounted fast on a piston rod connected to rotatably drive an output shaft. The return stroke of the piston rod moves a second piston mounted fast thereon in a second transfer chamber to push a fresh supply of liquid therefrom into the second conduit for admittance to the cylinder. Additional conduits are provided to admit fluid from a supply to the second transfer chamber during the second piston's down stroke and to exhaust the fluid from the first transfer chamber during the first piston's return stroke. A control device such as a cam arrangement driven by the output shaft controls valving in the conduits to regulate the supply of expansible propellant and the flow of liquid during the operating cycle.

14 Claims, 8 Drawing Figures

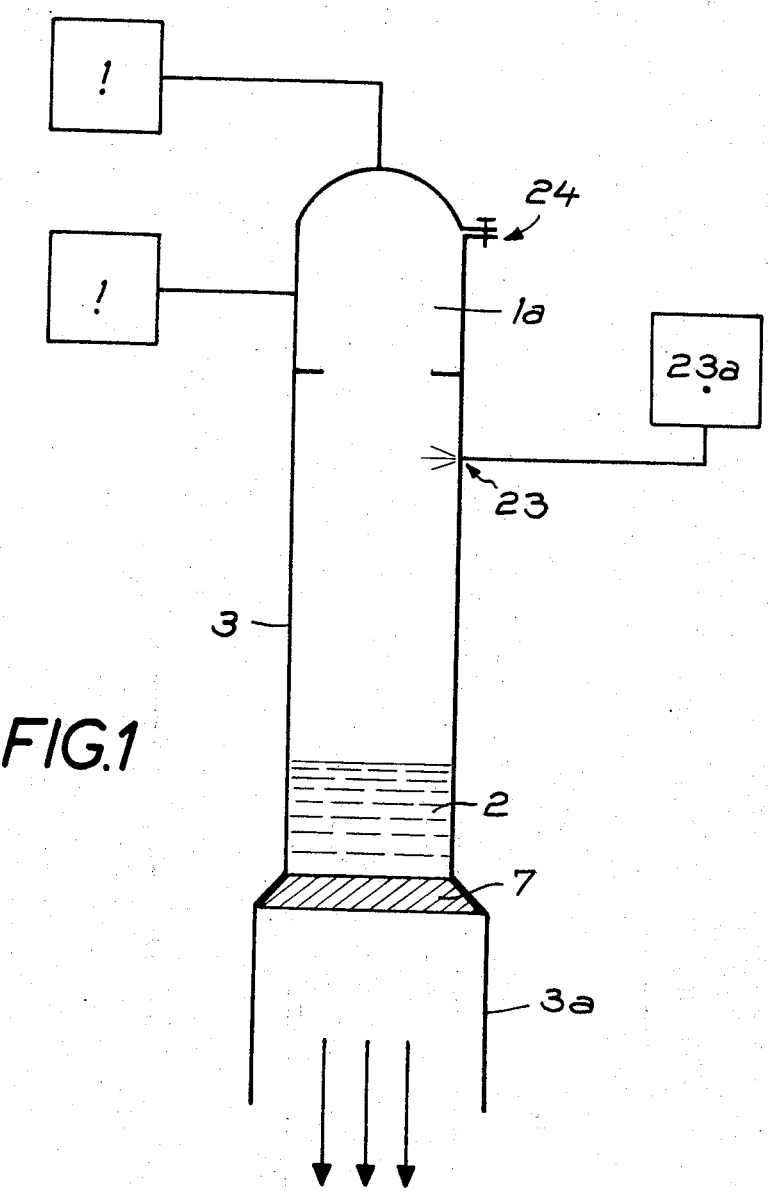

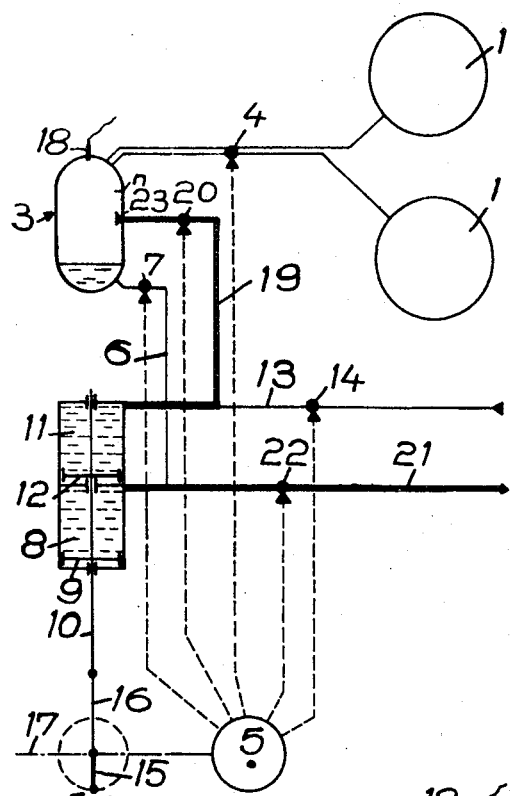
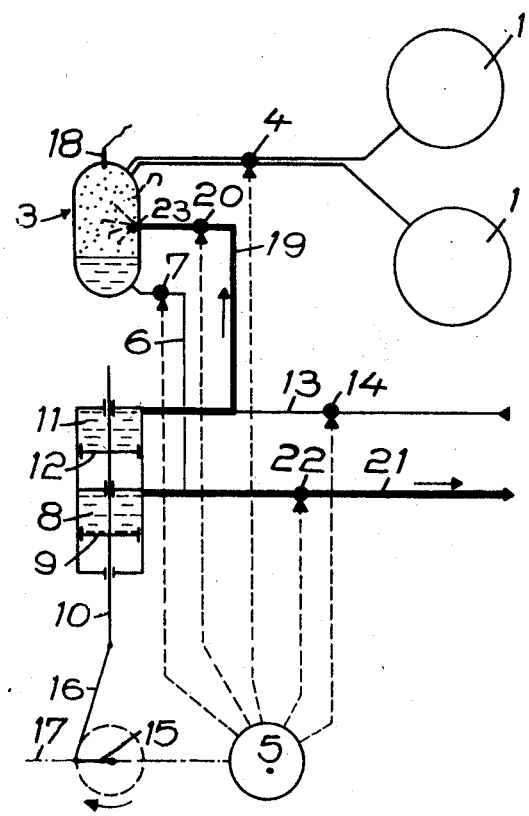

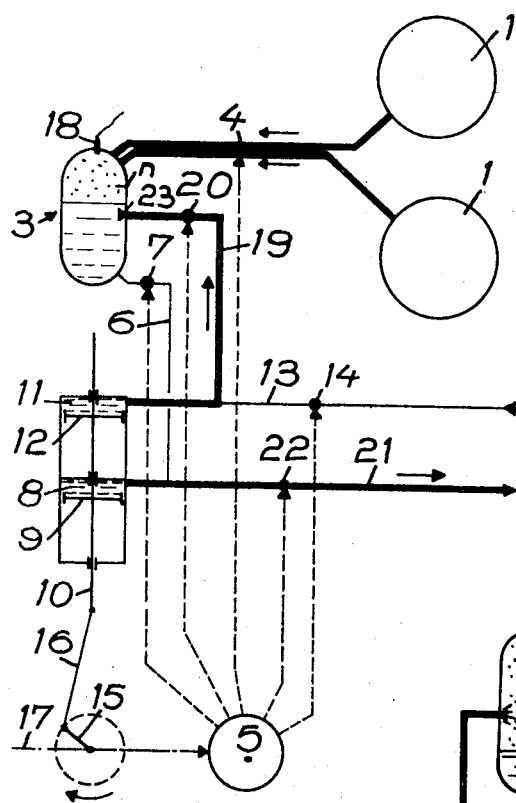
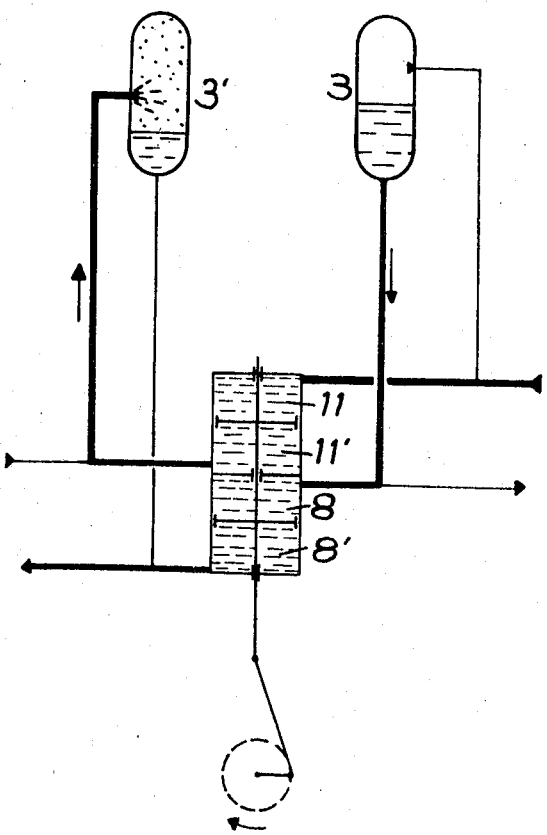
FIG.2e
FIG.3

HYDRAULIC HEAT ENGINE

The invention concerns an hydraulic heat engine particularly intended to operate when submerged and at any depth.

Previous attempts to construct engines which have a thermo dynamic cycle and operate under water at medium or great depth have generally resulted in systems, operating similarly to that in the open air, since the endeavour has been to isolate the system as much as possible from the ambient medium; this attitude is particularly noticeable in so called closed cycle systems, in which the ambient water, for example, is used only for its cooling properties.

It has already been proposed to operate engines at relatively great depths by enclosing them entirely in sealed casing and, for example, by neutralising the carbon dioxide gas, which is the main product of the reaction, by means of potash. In other examples, the idea has been adopted of operating turbine engines by dimensioning the system independence on the existence of a considerable external pressure. This leads to great dimensioning difficulties and, consequently, to very high specific consumption.

An object of the invention is to provide a heat engine, having an output which is better than that of the previously mentioned engines, and operates to a great extent, independently of the depth to which it is submerged, and the structure of which is such that the characteristics of the ambient medium are directly used in order to obtain a more simple operation.

Another object of the invention is to provide an engine mechanical part of which is solely in contact with a relatively cold liquid and has a mode of operation which is practically insensitive to external pressure, with a high output.

For this purpose, the invention relates to a hydraulic heat engine having means for the take-off of energy from a liquid comprising at least one working chamber to which there is introduced a working fluid, able to yield its energy by expansion, a circuit for injecting a cold liquid into the chamber, a circuit for extracting the liquid and condensed parts of the working fluid from said chamber, at least of the two circuits for injecting or extracting the liquid passing through the energy take-off means.

According to another feature, the hydraulic heat engine has a one-way valve disposed in the extraction circuit.

One of the advantages of the invention resides in the fact that the thermo dynamic cycle used may, without drawback, be located between the very high temperatures of the combustion gases, and the very low temperatures of the fluid, sea water for example.

Another advantage resides in the mechanically simplified system which has no or few constructional difficulties and which avoids the problem of gaskets or friction joints since the piston used in the working cylinder is a liquid piston.

Another advantage is that the specific consumption is low with respect to those which are necessary in known devices.

Another advantage resides in the fact that, after the fluid, for example water, has been forced back by the expansion of the combustion gases and after the one-way valve has been re-closed, any delay may be allowed for using the energy thus produced; the latter may be used with a very considerable power and with as many hydraulic motors or hydraulic jacks as desired.

Another advantage resides in the fact that the mechanical power may be obtained equally in the form of torque at the output of a rotating shaft or in the form of hydraulic pressure capable of remotely driving any member.

Other advantages and features of the invention will be further appreciated from the following description given hereafter as an example, with reference to the accompanying drawings in which;

FIG. 1 is a diagramatic sectional view of an embodiment of the invention;

FIGS. 2a, 2b, 2c, 2d, 2e illustrate a heat engine according to the invention in five successive positions of its operating cycle;

FIG. 3 illustrates another embodiment having two expansion chambers; and

Figure 2A:
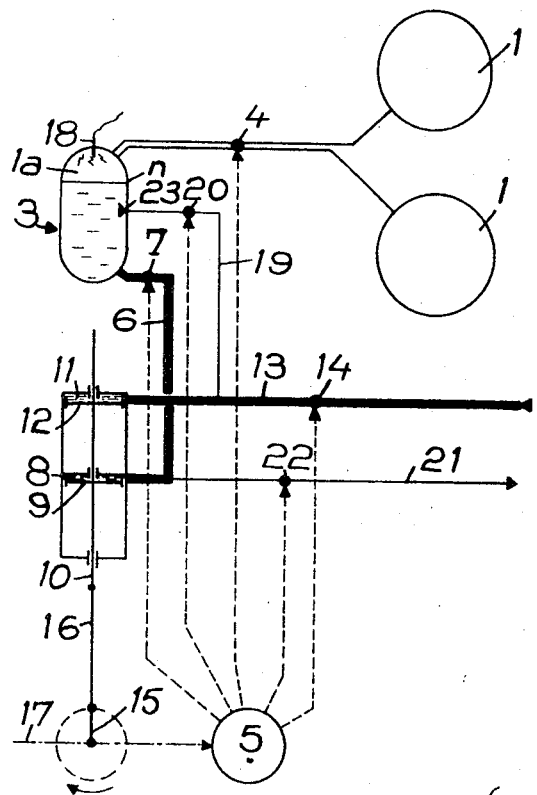
Figure 2B:
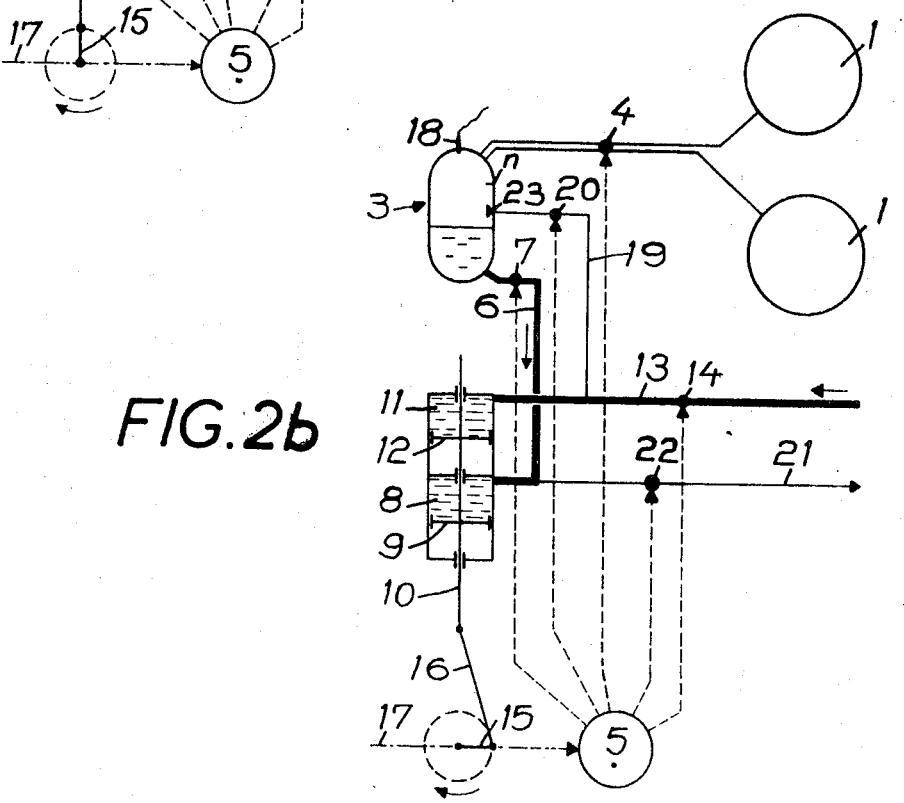

Referring to FIG. 1, the hydraulic heat engine comprises a working chamber in the form of a substantially vertical cylinder 3 which is closed in a water tight manner at its upper end by a combustion chamber 1a and which is closed, at its lower end, by a one-way valve 7 known per se, which makes it possible to connect the inside of the working chamber 3 to a reservoir of liquid which is, in the chosen example, sea water; the valve 7 allows movement only in the direction from inside the working chamber towards the ambient medium.

Below the level of the one-way valve 7, the working chamber 3 may be extended by a substantially cylindrical skirt 3a made of sheet metal thinner than that constituting the walls of the working chamber 3.

The combustion chamber 1a is supplied with reagents by a pump not shown, from a group of reservoirs 1, at pressure equal to that of the sea water, the connecting pipes between the said reservoirs 1 and the working chamber being provided with valves 4.

Finally, the cylinder 3 may be filled with sea water up to a predetermined level $n$, by injection means such as one or more injectors 23 and hydraulic pump 23a.

The operation of this simple hydraulic heat engine is as follows; at the beginning of the operation, the working chamber 3 is full of water, the reagent or reagents being admitted into the combustion chamber 1a in appropriate quantities; their combustion is then brought about and the latter brings them to a pressure equal, for example, to approximately three times the external pressure prevailing in the ambient medium. They expand, thus forcing back the column of water 2 which constitutes a liquid piston, through the one-way valve 7 and calculation shows that this forcing back continues until the gas pressure has fallen to approximately half that prevailing in the ambient medium.

This result is obtained by means of the recovery of the kinetic energy of the column of water 2, stored in the first part of the expansion. During this operation, water vapour is produced from the free surface of the water column and from the water streaming over the walls, which ensures the cooling of the said walls.

Consequently, the natural cooling of the gaseous mass causes the pressure prevailing inside the working chamber 3 to fall to a value much less than half the pressure prevailing in the ambient medium. The one-way valve 7 opposes the return of water through the lower end of the said chamber and the energy can thus be recovered by causing water to re-enter through the hydraulic pump 23a.

In the example of a hydraulic heat engine of this type which has a cylinder capacity equal to 1 cubic metre and which is submerged at a depth of 500 metres, it has been ascertained that the energy recovered during each cycle is of the order of 1.3 hp per hour. If the system operates 60 times per hour, the power available is thus 80 hp.

The specific consumption when using a mixture of compressed oxygen and kerosene, still in the case of an emersion of a depth of 500 metres, related to all products consumed is 2kg/per hp/hour. When used at a depth of 500 metres, the combustion pressure may be fixed at 150 bars and the pressure at the end of the expansion is thus equal to approximately 25 bars, which pressure falls to a few bars as soon as the first 50 litres of water are introduced, due to the condensation of the vapour contained by the cylinder having a volume of 1 cubic metre. This condensation is facilitated if the water injected is sprayed, the combustion products contain mainly water and carbon dioxide; the first part condenses, whereas the other part may dissolve entirely at the end of re-compression, due to the magnitude of the mass of water used.

The hydraulic heat engine according to FIGS. 2a to 2e is an engine which comprises two reservoirs 1 in which the substance for supporting combustion and the fuel are stored, which may advantageously be compressed oxygen and a hydro carbon which can be supplied at a fixed pressure via a set of pressure regulator valves (not illustrated). They are introduced into the working chamber 3 through closing or opening members such as valves 4 controlled by a control device 5; in FIG. 2a, these valves 4 are assumed to be closed. The working chamber 3 also contains a certain quantity of water filling it up to a level n. The working chamber 3 is connected by an extraction circuit 6 through the valve 7, assumed to be open in FIG. 2a, to a transfer chamber 8 of variable volume, full of water, the volume of which varies due to movement of a mobile piston 9 integral with rod 10; another transfer chamber 11 of variable volume has a piston 12 integral with the same rod 10 and of the same diameter as the piston 9; the volumes of the transfer chambers 8 and 11 are variable simultaneously in the same direction and by substantially equal amounts. In FIG. 2a, the chamber 11 is connected to the ambient water through a conduit 13 and a valve 14 which is assumed to be open by the device 5; this device may, for example, comprise a set of cams acting on the various valves by means of a set of feeler rollers and transmission rods. This device 5 is integral in rotation with a crank arm 15 connected to the rod 10 by a connecting rod 16; and output shaft 17 of the system is driven by this crank arm 15; it may comprise a fly wheel, counter balance weights and drives a number of accessories (not illustrated) such as a dynamo, starter, ignition device.

In FIG. 2a, the engine is at what is customarily called the top dead centre; the filling with fuel products and the substance supporting combustion has taken place in a preceding stage and the ignition occurs by supplying voltage to a spark plug 18. As a result of the increase in pressure subsequent to the ignition, the water contained in the working chamber 3 is driven through the extraction circuit 6 into the transfer chamber 8; the engine passes in succession through the positions illustrated in FIGS. 2b and 2c where it has reached the bottom dead centre; the combustion gases expanding, produce work; at the same time, the transfer chamber 11 fills with water taken from outside through the conduit 13.

At the bottom dead centre (FIG. 2c), the valve 7 and valve 14, open until now, close and valves 20 and 22 provided in injection circuit 19 and conduit 21 respectively connecting the transfer chambers 11 and 8 to the working chamber 3 and to the outer medium open; thus, the transfer chamber 11 which has just filled with water taken from the outside is conected to the working chamber 3, through the circuit 19 for injecting water into the chamber 3 through a set of nozzles 23 intended to atomize the injected water. Similarly, the transfer chamber 8, full of water coming from the working chamber 3, is put in direct connection with the external water. Under the effect of inertia, the shaft 17 continues to rotate, the transfer chamber 8 empties into the external water and the transfer chamber 11 empties into the working chamber 3; the water thus injected into the working chamber 3 in the form of a mist helps to very rapidly cool the combustion gases which have just expanded; the water vapour produced by combustion condenses and the carbon dioxide dissolves; those gases which have not been burnt are re-compressed in order to take part in the next operating cycle. Thus the engine passes through the positions shown in 2d and 2e, the liquid level rising gradually due to condensation of the mist of cooling water; it may be arranged, as can be seen in FIG. 2e, for the injectors 23 to be below the maximum water level n so that the filling with water terminates without the creation of any mist. Finally, in FIG. 2e, the valves 4 open under the action of the device 5 in order to allow the admission of the mixture under pressure in order to prepare for the next cycle.

Figure 4:
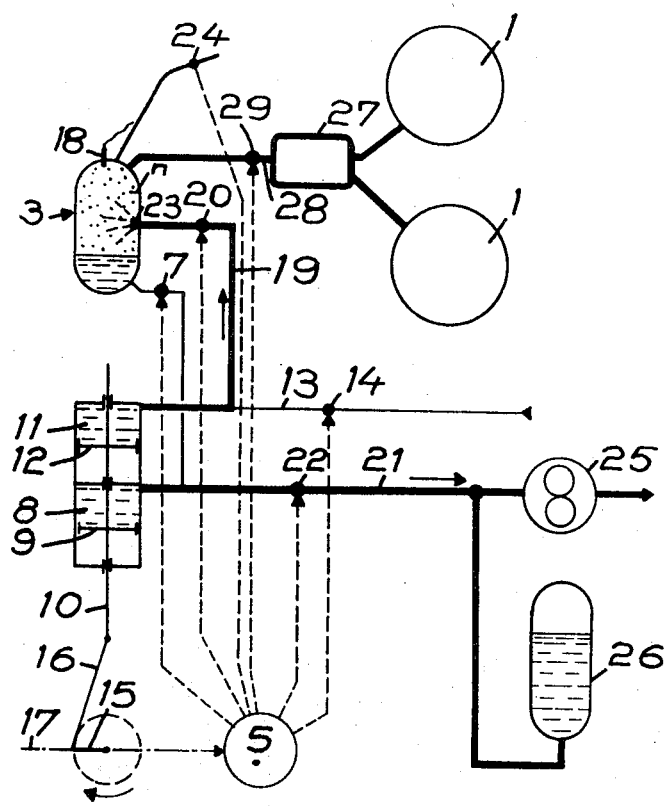
FIG. 4 is another embodiment according to the invention.

Due to the choice of another reactive mixture, or to combustion faults with the oxygen-hydrocarbon mixture, gases may be produce, which are insoluble or only slightly soluble and which cannot condense; as shown in FIG. 4, an additional valve 24 can be provided to connect the working chamber 3 to the outside under the control of the device 5; this valve 24 is open as long as the pressure prevailing in the working chamber 3 reaches values close to the outer ambient pressure.

The power of this engine is independent of the depth to which it is submerged; this fact becomes evident upon examination of FIG. 3 in which two working chambers 3 and 3' are provided and in which additional parts 8' and 11' of the transfer chambers 8 and 11 are used.

For clarity in the drawing, FIG. 3 shows only the working chambers 3 and 3', the transfer chambers 8 and 8', 11 and 11', the open conduits in heavy black lines (as in the previous Figures), and the closed conduits in normal lines. Under the action of the device 5 (not shown), the operation of the valves, the charging, possibly the removal of uncombustible gases and the ignition take place exactly as in the foregoing description, for each of the chambers, but naturally, in phase opposition. It can be seen, at the stage of operation illustrated in FIG. 3, that the outer water exerts its pressure in the transfer chambers 11 and 8' the two effects compensating each other due to the fact that the pistons are of the same diameter.

Naturally, the embodiment may comprise a greater number of expansion chambers, in order to regulate the output torque and a rotary mechanism may advantageously be used such as pumps and hydraulic motors known per se, in order to carry out more easily the functions of transfer, obtained here by cylinders having an alternating movement, and transmission; in order that the engine thus provided remains insensitive to the value of the external pressure, it is necessary that the transfer chambers for the inlet and outlet of liquids always have substantially the same cubic capacity.

One may take into account that the combustion of hydrocarbons produces water and thus that the volume of the outgoing liquids is slightly greater than the volume of the incoming liquids, which makes it necessary to give the transfer chambers 8 and 8' a slightly greater cubic capacity than those of the transfer chamber 11 and 11'.

Finally, it is not essential to recover the mechanical work in the form of torque at the output shaft 17; without any modification of principle, the shaft 17 may also be used for the sole purpose of driving accessory devices or providing a reduced effort and connecting the transfer chamber 8 to a reservoir serving as an accumulator 26 at a much higher pressure than the outer pressure. The water under pressure thus produced may also be used for driving jacks or hydraulic motors, such as a motor 25 in FIG. 4.

The symmetrical arrangement with two expansion chambers according to FIG. 3 is particularly attractive in this case since the connecting rod bearings only have to support the forces due to the drive of the accessory devices.

The engines which have been described in FIGS. 2 to 4 operate on the basis of a two stroke cycle. It is possible, by a simple modification of the device 5, to make them operate with a four stroke cycle with the customary stages of intake, compression, expansion and exhaust; an advantageous use of the direct compression is by re-injecting water into the working chamber 3 in the form of a liquid piston, in order to avoid wetting the fuel mixture excessively; in other words, only the so-called exhaust phase would comprise an inlet of water sprayed in the form of a mist, the said compression phase comprising an inlet or water from below. Thus, apart from modification to the operation of the valves regulating the passage of the fluids, the engine is the same as in FIG. 4. Naturally, in this case, it is useless for the reservoirs 1 to be under pressure. Tables I and II show the opening sequence of the various valves in the two and four stroke cycles.

TABLE I — 2 Stroke Cycle

|  | Power Stroke | Power Stroke |  |
|---|---|---|---|
| Valve 4 |  | xxx | xxx |
| Valve 7 | xxxxxxxxxxxxx | xxxxxxxxxxxxx |  |
| Valve 14 | xxxxxxxxxxxxx | xxxxxxxxxxxxx |  |
| Valve 20 | xxxxxxxxx |  | xxxxxxxxxxx |
| Valve 22 | xxxxxxxxx |  | xxxxxxxxxxx |
| Valve 24 |  | xxx | xxx |
| Volume 11 | increases | decreasesincreases | decreases |

TABLE II — 4 Stroke Cycle

|  | Power Stroke | Exhaust | Intake | Compression |
|---|---|---|---|---|
| Valve 4 |  |  | xxxxxxxxxx |  |
| Valve 7 | xxxxxxxxxxx |  | xxxxxxxxxxx | xxxxxxxxxxx |
| Valve 14 | xxxxxxxxxxx |  | xxxxxxxxxxx | xxxxxxxxxxx |
| Valve 20 |  | xxxxxxxxx |  |  |
| Valve 22 |  | xxxxxxxxx |  |  |
| Valve 24 |  | xxx |  |  |
| Volume 11 | increases | decreasesincreases |  | decreases | xxxxxx indicates the formation of a connection

In another embodiment, the engine can be supplied directly with fluid able, by expansion, to produce work this fluid can come from a boiler, a reservoir containing gas under pressure or a combustion chamber 27 (FIG. 4) permanently supplied with a fuel mixture from reservoirs 1 by means (not shown) which can be relief valves if the reservoirs 1 are under pressure; the combustion reaction is continuous in the chamber 27 and the combustion gases are introduced to the working chamber 3 through a conduit 28 by means of a distribution device 29 able to establish or interrupt the transmission of hot gases, under the control of the device 5. In this case, an engine with several expansion chambers having staggered cycles is advantageously used in order that the combustion chamber 27 continually discharges into at least one expansion chamber.

The various components illustrated in FIG. 4 (gas exhaust valve 24, output motor 25, output accumulator 26, independent combustion chamber 27) may be used independently of each other, both with a single cylinder arrangement of the type in FIG. 2 and with a balanced two cylinder arrangement of the type in FIG. 3. What is claimed is:

1. An hydraulic heat engine comprising at least one working chamber, means for introducing into said chamber a working fluid capable of yielding energy by expansion, a circuit for injecting a cold liquid into said chamber, a circuit for extracting a part of the liquid, said extracting circuit being provided with a one-way valve covered by said liquid, the injection of the cold liquid being made when the said one-way valve is closed, an hydraulic pump disposed in the circuit for injecting the cold liquid, the expansion of the working fluid in said chamber acting on said liquid for forcing said liquid into said extracting circuit.

2. An hydraulic heat engine according to claim 1, in which the working chamber is connected to at least two transfer chambers each of variable volume and each connected to a common reservoir of the liquid, a movable piston in each transfer chamber for varying the volume thereof, the pistons are mechanically connected to one another and the volumes of the said transfer chambers are permanently substantially equal, control means for controlling the opening and closing of the circuits for the injection and extraction of liquid, said control means integral with the mechanical connection connecting the said moving parts whereby during an operating cycle the working chamber is alternately connected to each of the transfer chambers one of which is alternately connected to the liquid reservoir.

3. An hydraulic heat engine according to claim 2, in which the extraction circuit opens into a lower part of said working chamber.

4. An hydraulic heat engine according to claim 1, in which the circuit for injecting liquid is provided with atomizer means for atomizing the said liquid as it enters the working chamber.

5. An hydraulic heat engine according to claim 2, in which the control means act on means for exhausting the working chamber.

6. An hydraulic heat engine according to claim 2, in which the control means are able to connect the working chamber to a separate combustion chamber located between a fuel reservoir and the said working chamber.

7. An hydraulic heat engine according to claim 2, in which the control means are able to connect the working chamber to a boiler in which the working fluid is previously heated by exchange with an external source.

8. An hydraulic heat engine according to claim 2, in which the mechanical connection connecting the moving parts of the transfer chambers is a mechanical output shaft.

9. An hydraulic heat engine according to claim 2, in which the transfer chambers are connected to the liquid reservoir via an hydraulic motor known per se.

10. An hydraulic heat engine according to claim 9, in which an hydraulic accumulator is connected to an input to the hydraulic motor.

11. An hydraulic heat engine according to claim 2, in which associated with the two transfer chambers connected to a first working chamber and to the liquid reservoir are two other transfer chambers having variable volumes, whose volumes vary inversely to the former and which are connected to a second working chamber and to the liquid reservoir.

12. An hydraulic heat engine comprising at least one working chamber, means for introducing into said working chamber a working fluid capable of yielding energy by expansion, at least two transfer chambers connected thereto, each transfer chamber being of variable volume, a reservoir of liquid connected to each transfer chamber, a movable piston in each transfer chamber for varying the volume thereof, said pistons being mechanically connected with one another so that the volumes of said transfer chambers are always substantially equal, a circuit for injecting a cold liquid into said working chamber, a circuit for extracting liquid and condensed portions of the working fluid from said working chamber, at least one of said two circuits passing through energy take-off means, control means for controlling the opening and closing of the circuits for the injection and extraction of liquid to and from said working chamber, said control means being integral with the mechanical connection of the pistons with one another whereby during the operating cycle said working chamber is alternately connected to each of said transfer chambers, one of which is alternately connected to said reservoir, a complete operating cycle of said control means being effected in the time necessary for the volume of said transfer chambers to increase and decrease once in each direction, said working chamber being connected to one transfer chamber during the increase in volume and to the other transfer chamber during the decrease in volume.

13. An hydraulic heat engine comprising at least one working chamber, means for introducing into said working chamber a working fluid capable of yielding energy by expansion, at least two transfer chambers connected thereto, each transfer chamber being of variable volume, a reservoir of liquid connected to each transfer chamber, a movable piston in each transfer chamber for varying the volume thereof, said pistons being mechanically connected with one another so that the volumes of said transfer chambers are always substantially equal, a circuit for injecting a cold liquid into said working chamber, a circuit for extracting liquid and condensed portions of the working fluid from said working chamber, at least one of said two circuits passing through energy take-off means, control means for controlling the opening and closing of the circuits for the injection and extraction of liquid to and from said working chamber, said control means being integral with the mechanical connection of the pistons with one another whereby during the operating cycle said working chamber is alternately connected to each of said transfer chambers, one of which is alternately connected to said reservoir, a complete operating cycle of said control means being effected in the time necessary for the volume of said transfer chambers to increase and decrease twice in each direction, said working chamber being connected to one of said transfer chambers for three consecutive periods during which its volume increases twice and decreases once and being connected to said other transfer chamber during the fourth period during which its volume decreases.

14. An hydraulic heat engine comprising at least one working chamber, means for introducing into said working chamber a working chamber a working fluid capable of yielding energy by expansion, at least two coaxial transfer chambers connected thereto, each transfer chamber being of variable volume, a reservoir of liquid connected to each transfer chamber, a movable piston in each transfer chamber for varying the volume thereof, said pistons being mechanically connected with one another so that the volumes of said transfer chambers are always substantially equal, a circuit for injecting a cold liquid into said working chamber, a circuit for extracting liquid and condensed portions of the working fluid from said working chamber, at least one of said two circuits passing through energy take-off means, control means for controlling the opening and closing of the circuits for the injection and extraction of liquid to and from said working chamber, said control means being integral with the mechanical connection of the pistons with one another whereby during the operating cycle said working chamber is alternately connected to each of said transfer chambers, one of which is alternately connected to said reservoir.

* * * * *

UNITED STATES PATENT OFFICE
CERTIFICATE OF CORRECTION

Patent No. 3,815,555  Dated June 11, 1974

Inventor(s) Jean Andre Georges Tubeuf

It is certified that error appears in the above-identified patent and that said Letters Patent are hereby corrected as shown below:

Under [30] Foreign Application Priority Data please change 72.09846 to --71.09846-- and change 72.14022 to --71.14022--

Signed and sealed this 19th day of November 1974.

(SEAL)
Attest:

McCOY M. GIBSON JR.
Attesting Officer

C. MARSHALL DANN
Commissioner of Patents